United States Patent [19]

Roberts et al.

[11] Patent Number: 5,263,675
[45] Date of Patent: Nov. 23, 1993

[54] SUPPORT ASSEMBLY

[76] Inventors: Jack O. Roberts, 6753 SW. 67th;
Gordon G. Gribling, Jr., 5570 SW.
McVey, both of Redmond, Oreg.
97756

[21] Appl. No.: 482
[22] Filed: Jan. 5, 1993
[51] Int. Cl.⁵ .............................. A47B 96/06
[52] U.S. Cl. .................... 248/219.4; 182/142; 211/107
[58] Field of Search ............... 248/218.4, 219.1, 219.4, 248/219.3, 230, 231; 211/107; 52/697, 40; 182/142,187; 108/152

[56] References Cited

U.S. PATENT DOCUMENTS

| 1,256,688 | 2/1918 | Hall . | |
|---|---|---|---|
| 1,528,268 | 3/1925 | Schlegel . | |
| 1,712,974 | 5/1929 | Venard | 182/187 X |
| 3,115,213 | 12/1963 | Cloutier | 182/187 |
| 3,136,519 | 6/1964 | Spriggle . | |
| 3,240,863 | 3/1966 | Brede | 248/219.1 X |
| 3,568,797 | 3/1971 | Hardy | 182/142 |
| 3,790,116 | 2/1974 | Schulman | 211/107 X |
| 3,990,537 | 11/1976 | Swenson | 248/219.1 X |
| 4,027,357 | 6/1977 | Morris . | |
| 4,580,317 | 4/1986 | Timothy . | |
| 4,615,077 | 10/1987 | Beebe . | |
| 4,651,384 | 3/1987 | Horkhonen . | |
| 4,656,693 | 4/1987 | Brooks . | |
| 4,722,501 | 2/1988 | Ruhl . | |
| 4,730,803 | 3/1988 | Hillstrom | 248/219.4 X |
| 4,763,942 | 8/1988 | Lyon . | |
| 4,886,143 | 12/1989 | Dubroc | 182/142 |
| 4,903,372 | 2/1990 | Jones . | |
| 4,909,555 | 3/1990 | Blasi . | |
| 5,049,110 | 9/1991 | Owens . | |
| 5,060,756 | 10/1991 | D'Acquisto | 108/152 X |
| 5,083,324 | 1/1992 | Strong | 182/187 X |
| 5,092,554 | 3/1902 | Gibbs . | |

Primary Examiner—J. Franklin Foss
Attorney, Agent, or Firm—Klarquist, Sparkman, Campbell, Leigh & Whinston

[57] ABSTRACT

A support assembly is composed of three elongate substantially rigid members which may be releasably interconnected by connectors to form a triangular support structure. The rigid members when disconnected from the support bracket configuration are constructed to be assembled in a nested configuration and connected together in such nested configuration for compact carrying and storage. An extensible gambrel for use with the support bracket in its operative condition also is constructed to be attached to the nested members for convenient carrying and storage.

13 Claims, 2 Drawing Sheets

SUPPORT ASSEMBLY

BACKGROUND AND SUMMARY OF THE INVENTION

This invention relates to a support assembly, and more particularly to a collapsible support assembly including parts which may be easily and compactly nested for storing and carrying.

Those who travel into the field, such as hunters, campers, and those working in remote field locations, often have need for a support assembly, or bracket, on which items may be supported. Often the only upright element in the area is a tree trunk, or pole, and thus the support assembly should be adapted to mount on such.

Previous devices have been developed to mount on upright elements, such as tree trunks and poles. However, for the most part, these either do not provide sufficient rigidity in their support function, or are not constructed to collapse into a convenient nested relationship of parts for easy carrying and storage.

A general object of the present invention is to provide a novel support assembly which may be conveniently carried to a field location by a user, assembled, and provides a substantially rigid support bracket.

Another object is to provide such a novel support assembly which may be conveniently secured to and supported by a tree or other upright element.

Yet another object of the present invention is to provide such a novel support assembly which includes at least three elongate rigid members which may be releasably connected in a triangular support bracket configuration, and when disconnected nest within each other to provide a compact stowed configuration.

A still further object of the present invention is to provide such a novel support assembly which also includes a telescopically extensible gambrel which may be suspended from the support bracket for hanging items, such as animal carcasses for skinning and dressing in the field.

BRIEF DESCRIPTION OF THE DRAWINGS

These and other objects and advantages will become more fully apparent as the following description is read in conjunction with the drawings wherein.

DETAILED DESCRIPTION OF THE PREFERRED EMBODIMENT

Figure 1:
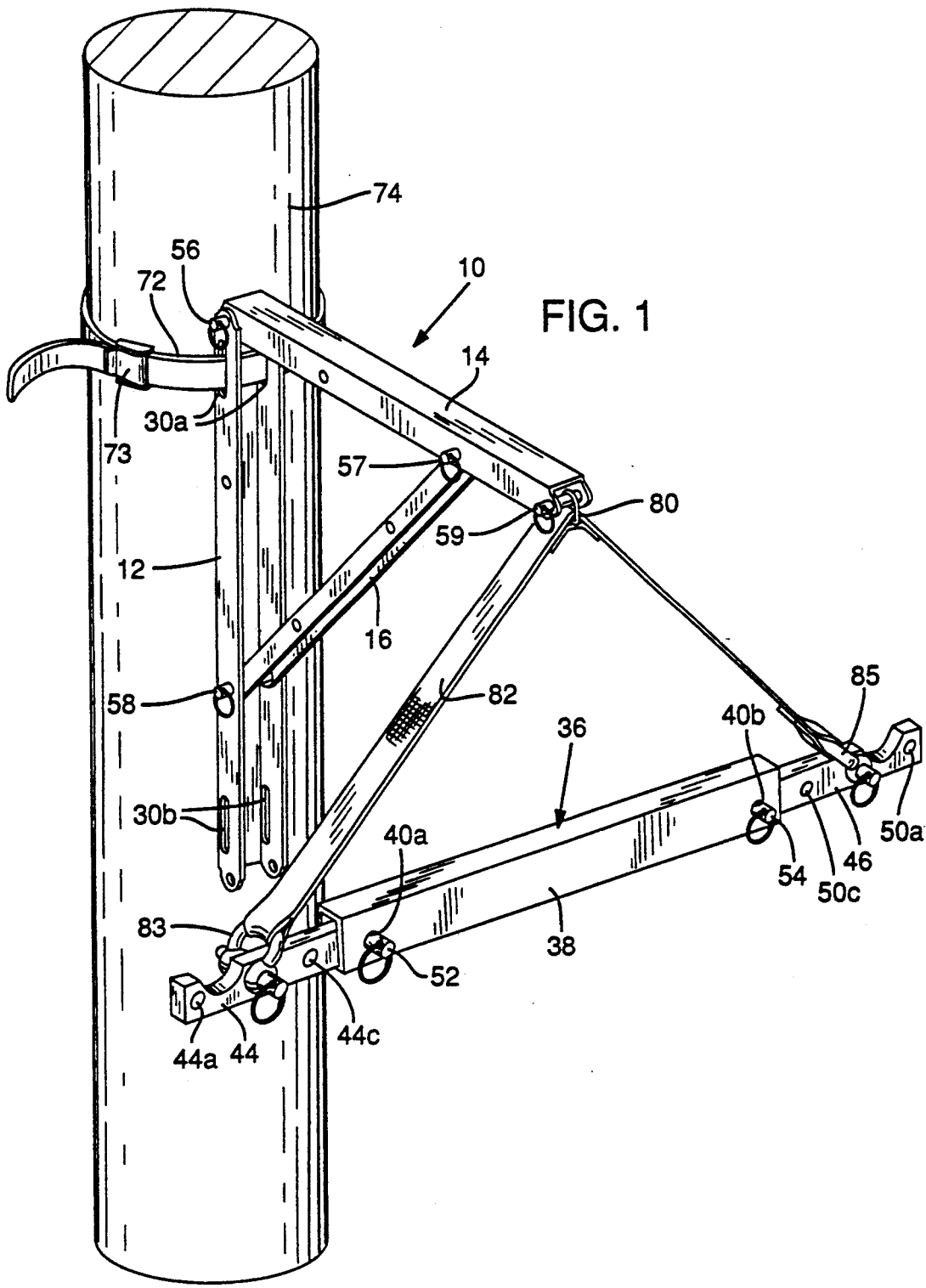
FIG. 1 is a perspective view of a support assembly according to an embodiment of the invention in support bracket configuration secured to a tree trunk.

Referring to the drawings, a support assembly 10 according to a preferred embodiment of the invention includes, as major components, three substantially rigid, elongate channel-shaped members 12, 14, 16.

Each of the rigid members is a channel section having a pair of elongate parallel side rails 12a, 12b, 14a, 14b, and 16a, 16b, respectively. Each member also has a substantially planar web portion joining its spaced side rails noted at 12c, 14c, 16c, respectively.

Figure 2:
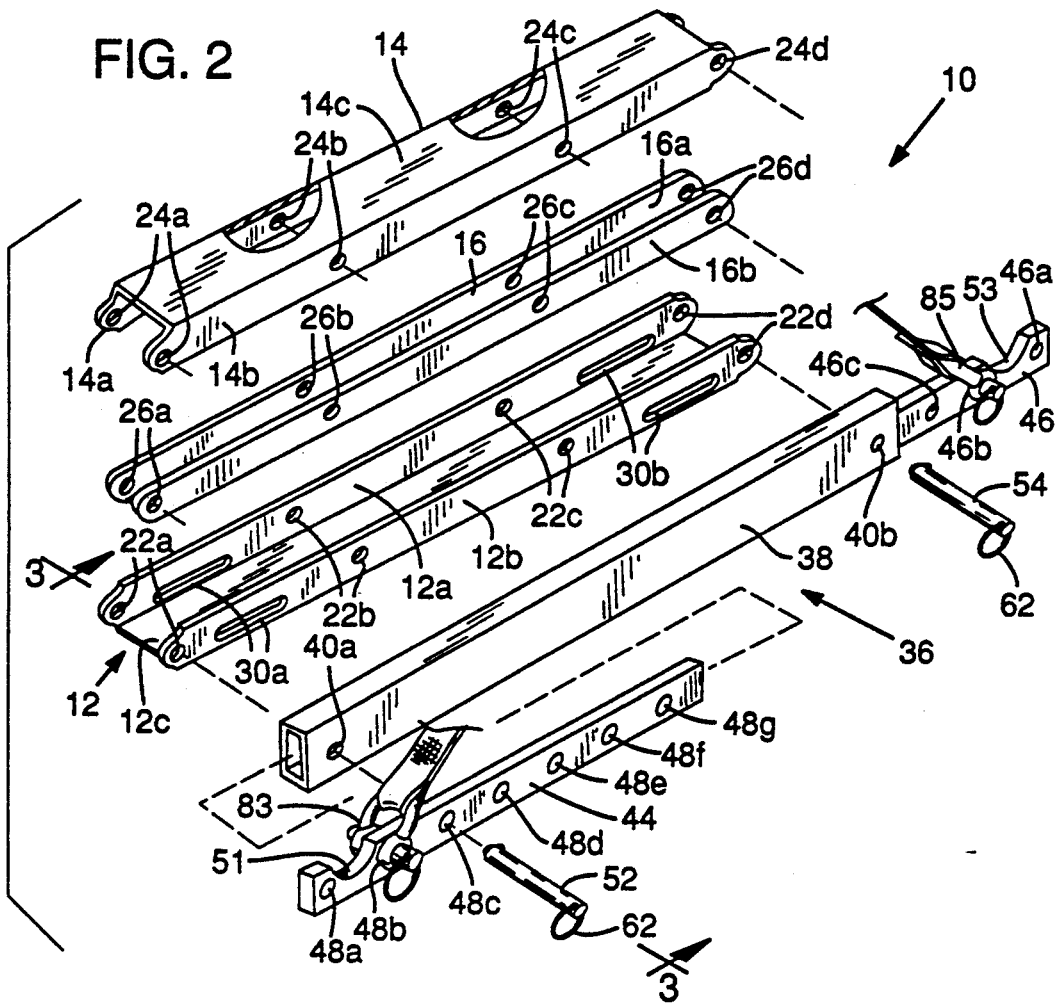
FIG. 2 is an exploded perspective view of component parts of the assembly ready to be placed in nested storage position.
Figure 3:
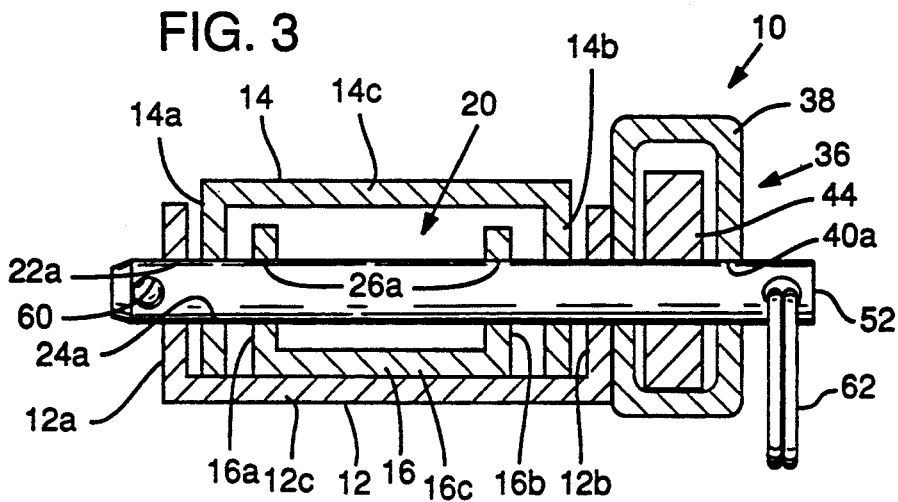
FIG. 3 is a cross-sectional view of the components taken generally along line 3—3 in their nested storage position.

As is best seen in FIGS. 2 and 3, the cross-sectional size of member 16 is less than the cross-sectional size of member 14, and the cross-sectional size of member 14 is smaller than the cross-sectional size of member 16, so that the members may nest within each other to form a compact stowed assembly as illustrated in FIG. 3. Explaining further, the inner side-to-side dimension of the channel between side rails 12a, 12b defines a pocket which is greater in size than the outer side-to-side dimensions of side rails 14a, 14b, as seen in FIG. 3. Likewise, the inner side-to-side dimension of the channel between side rails 14a, 14b is greater than the outer side rail dimensions of side rails 16a, 16b.

With the configuration thus described, the members may be placed in a nested configuration as illustrated in FIG. 3 extending parallel to one another. Channel members 12, 14 may nest in face-to-face relation with their side rails overlapping and forming a pocket 20 therebetween. The cross-sectional configuration of member 16 is of such size that it rests comfortably in pocket 20 formed by channel members 12, 14.

Referring to FIG. 2, a plurality of spaced bores 22a, 22b, 22c, 22d, are formed in opposed rails of member 12. Bores with like numbers align laterally of the member. These are all spaced substantially equidistant along the rail.

A plurality of bores 24a, 24b, 24c, 24d are likewise formed in opposed rails of member 14, and bores 26a, 26b, 26c, 26d are formed in the opposed side rails of member 16. Bores with like numbers are aligned laterally of the members. The spacings of bores 24a, 24b, 24c, 24d and 26a, 26b, 26c, 26d correspond to the spacing of bores 22a, 22b, 22c, 22d on member 12. When the members are placed in nesting relationship, as illustrated in FIG. 3, bores in the members align to permit pins to be inserted therethrough to secure them in nested relationship, as will be described in greater detail below.

A pair of laterally aligned elongate slots 30a are formed in side rails 12a, 12b of member 12 adjacent its end nearest the viewer in FIG. 2. A similar pair of elongate slots 30b are formed in opposed side rails 12a, 12b adjacent the end distant from the viewer in FIG. 2.

A telescopically extensible gambrel is indicated generally at 36. The gambrel includes an elongate tubular member 38 having a substantially rectangular hollow cross-section. This tubular member has bores 40a, 40b, extending laterally therethrough. The spaces between the bores 40a, 40b in member 38 are similar to the spacing of the end bores in members 12, 14, 16.

A pair of elongate extension members 44, 46 are received in and extend outwardly from opposite end portions of the tubular member. The extension members have a plurality of spaced bores 48a, 48b, 48c, 48d, 48e, 48f, 48g for member 44 and 50a, 50b, 50c (which are visible) for member 46. Other bores for extension member 50 are hidden in the portion which is received in tubular member 38. The extension members also have upwardly facing arcuate openings 51, 53 adjacent their outer ends.

A pair of pins 52, 54, having pull rings 62 thereon are illustrated aligned with bores 40a, 40b, in FIG. 2. These pins, as best illustrated for pin 52 in FIG. 3, have spring biased balls 60 thereon at the end opposite the pull ring 62. These pins have sufficient length that they may extend through the bores in gambrel 36, and bores in members 12, 14, 16 when lying in nested relationship to hold the gambrel and members in their stowed position as illustrated in FIG. 3.

Referring to FIG. 1, the support assembly is illustrated in its operative support bracket configuration. Adjacent ends of members 12, 14 are connected by a pin 56 which extends through aligned bores 22a, 24a in the members. Remainder portions of members 12, 14 are disposed at a substantial angle relative to each other and member 16 is extended at an angle therebetween. The end bores 26a, 26d adjacent opposite ends of member 16 are aligned with bores 22c, 24c in members 12, 14 spaced from pin 56. Pins 57, 58 are extended through such aligned bores to interconnect the rigid members to form a triangular support bracket as illustrated.

An elongate flexible strap 72 received through slots 30a in the side rails of member 12 is wrapped around a tree trunk 74 and secured thereon by a buckle 73. The strap supports the bracket on the tree at the level desired and rigid member 12 rests against the tree to provide a rigid triangular support bracket to hold items for the user. A second strap could be extended through slots 30b and secured about the free trunk for added securement.

A pin 59 is extended through bores 22d in the side rails at the outer end of member 14 from which an auxiliary hook 80 is suspended. Another strap 82 is connected at its opposite ends by clevises 83, 85 to extension members 44, 46 and is connected adjacent its center to hook 80 to suspend gambrel 36 therefrom. The extension members 44, 46 of the gambrel are set at a desired extension positions with pins 52, 54 extending through aligned bores in tubular member 3 and the extension members to hold them in their selected extended positions.

The gambrel may be used to hang large animal carcasses as is known for skinning and dressing.

It should be recognized that other attachments also may be supported by the triangular bracket assembly for use in the field.

Thus, it will be seen that the present invention provides an assembly which can be interconnected to form a triangular support bracket for attachment to an upright element to provide a rigid support for use in the field as seen in FIG. 1. When the support is no longer needed the parts are quickly and easily disassembled by removal of the pins, and the rigid members making up the support bracket are placed in nesting relationship for convenient carrying and storing. Pins extending through aligned bores in the channel members 12, 14, 16 hold them in their nested position as shown in FIG. 3. The gambrel also may be collapsed and pins may extend through aligned bores in the gambrel and the nested channel members to secure them in their compact storage and carrying configuration.

While a specific embodiment of the invention has been described herein, it should be apparent to those skilled in the art that variations and modifications are possible without departing from the spirit of the invention as set out in the following claims.

I claim:

1. A support assembly comprising three elongate substantially rigid members and connectors releasably interconnecting said members to form a triangular support bracket, said members upon release of said connectors being constructed to nest within each other to provide a compact assemblage of parts, two of said members comprising channel-shaped members, each having a pair of opposed side rails and a joining web, which members may be placed in face-to-face orientation with side rails thereof overlapping to form a pocket therebetween of a first cross sectional size, and the third member having a smaller cross sectional size than said pocket to be received in said pocket.

2. The assembly of claim 1, wherein said members have a plurality of bores extending therethrough certain ones of which are aligned when the members are in a support bracket configuration and certain ones of which are aligned when the members are nested, and said connectors comprise pins extending laterally through said bores to releasably interconnect said members in their support bracket configuration and in their nested configuration.

3. A support assembly comprising three elongate substantially rigid members having bores extending therethrough and connector pins releasably extending through said bores to releasably interconnect said members to form a triangular support bracket, said members upon release of said connectors being constructed to nest within each other to provide a compact nested assemblage of parts, selected bores in said members being similarly spaced apart in all three members to align when the members are placed in their nested assemblage to allow pins to be inserted therethrough to interconnect said members in their nested assemblage.

4. The assembly of claim 3, which further comprises an elongate strap connected to one of said members adapted to encircle an upright element to support the assembly on said upright element.

5. The assembly of claim 4, wherein one of said members has a slot extending laterally therethrough to receive said strap.

6. A support assembly comprising three elongate substantially rigid members having bores extending therethrough and connector pins releasably extending through said bores to releasably interconnect said members to form a triangular support bracket, two of said members when in their assembled configuration having end portions overlapping each other with aligned bores extending therethrough and one of said pins extending through said bores, and remainder portions of said two members being disposed at a substantial angle relative to each other, each member having a second bore extending therethrough in a region spaced from said pin-connected end portions, and the third of said members having end bores extending therethrough adjacent its opposite ends and being positioned at an angle relative to and extending between said first two members with its end bores aligned with said second bores in said first two members, with certain of said connector pins extending through said second bores and end bores to interconnect the three members in a triangular configuration, said members upon release of said connector pins being constructed to nest within each other to provide a compact nested assemblage of parts.

7. A support assembly comprising three elongate substantially rigid members and connectors releasably interconnecting said members to form a triangular support racket, said members upon release of said connectors being constructed to nest within each other to provide a compact nested assemblage of parts, a telescopically extensible gambrel and means suspending said gambrel from said support bracket.

8. The assembly of claim 7, wherein said gambrel comprises an elongate tubular member, a pair of elongate extension members slidably received in and extending outwardly from opposite end portions of said tubular member, and means for securing said extension members in selected longitudinal positions relative to said tubular member.

9. The assembly of claim 8, wherein said tubular member has bores extending laterally therethrough adjacent its opposite end, an extension member has a plurality of spaced bores extending therethrough positioned to align with a bore in said tubular member at selected degrees of extension, and a pin extends through a bore in said tubular member and a selected bore in the extension member to releasably secure the extension member in position relative to the tubular member.

10. The assembly of claim 9, wherein said rigid members have bores extending therethrough which are aligned when said members are placed in their nested configuration, bores in said tubular member are positioned to align with said rigid member bores when said tubular member is placed adjacent said nested set of rigid members, and pins inserted through said aligned bores in said rigid members and tubular member secure the rigid and tubular members together.

11. The assembly of claim 8, wherein an extension member has an upwardly facing arcuate opening defined adjacent its outer end.

12. A support assembly comprising three elongate substantially rigid members and connectors releasably interconnecting said members to form a triangular support racket, said members upon release of said connectors being constructed to nest within each other to provide a compact assemblage of parts, with a first one of said members having an elongate channel pocket defined in and extending longitudinally thereof having a first side-to-side dimension, and said other members having smaller side-to-side dimensions than said first dimension permitting them to be received in said pocket in positions extending parallel to said one member.

13. The assembly of claim 12, wherein a second of said members has an elongate channel defined therein of a second side-to-side dimension and the third of said members has a side-to-side dimension less that said second dimension permitting it to test in said channel in said second member.

* * * * *